(12) United States Patent
Gautam et al.

(10) Patent No.: US 12,164,385 B2
(45) Date of Patent: Dec. 10, 2024

(54) PARALLELIZATION OF INCREMENTAL BACKUPS

(71) Applicant: Cohesity, Inc., San Jose, CA (US)

(72) Inventors: Amandeep Gautam, San Jose, CA (US); Venkata Ranga Radhanikanth Guturi, San Jose, CA (US)

(73) Assignee: Cohesity, Inc., San Jose, CA (US)

( * ) Notice: Subject to any disclaimer, the term of this patent is extended or adjusted under 35 U.S.C. 154(b) by 0 days.

(21) Appl. No.: 18/415,402

(22) Filed: Jan. 17, 2024

(65) Prior Publication Data

US 2024/0152430 A1     May 9, 2024

Related U.S. Application Data

(63) Continuation of application No. 17/872,307, filed on Jul. 25, 2022, now Pat. No. 11,921,587.

(51) Int. Cl.
*G06F 11/14* (2006.01)

(52) U.S. Cl.
CPC ...... *G06F 11/1451* (2013.01); *G06F 11/1461* (2013.01); *G06F 2201/84* (2013.01)

(58) Field of Classification Search
CPC .............. G06F 11/1451; G06F 11/1461; G06F 2201/84
See application file for complete search history.

(56) References Cited

U.S. PATENT DOCUMENTS

| | | | |
|---|---|---|---|
| 7,574,461 B1 | 8/2009 | Armorer | |
| 9,063,898 B1 * | 6/2015 | Merchant | G06F 11/1469 |
| 10,025,673 B1 * | 7/2018 | Maccanti | G06F 11/1451 |
| 11,656,992 B2 * | 5/2023 | Radi | G06F 12/0806 711/119 |
| 2009/0150628 A1 * | 6/2009 | Nakano | G06F 11/1451 711/E12.001 |
| 2011/0082832 A1 * | 4/2011 | Vadali | G06F 11/1451 711/E12.001 |
| 2012/0030260 A1 * | 2/2012 | Lu | G06F 11/1453 707/820 |
| 2015/0268864 A1 * | 9/2015 | Bernat | G06F 3/065 711/162 |
| 2020/0104259 A1 * | 4/2020 | Wang | G06F 12/0826 |
| 2021/0200641 A1 | 7/2021 | Bafna | |
| 2022/0043775 A1 | 2/2022 | Sharma | |

(Continued)

OTHER PUBLICATIONS

Extended Search Report from counterpart European Application No. 23187471.0 dated Nov. 29, 2023, 10 pp.

(Continued)

*Primary Examiner* — Jared M Bibbee
(74) *Attorney, Agent, or Firm* — Shumaker & Sieffert, P.A.

(57) ABSTRACT

An assigned subgroup that includes a plurality of entries is traversed by a prefetcher. It is determined that an expected number of entries associated with the assigned subgroup have been traversed. In response to determining that expected number of entries associated with the assigned subgroup have been traversed, it is determined that a last read entry associated with the assigned subgroup does not correspond to a last entry associated with the assigned subgroup. The prefetcher is preempted by stopping the prefetcher from obtaining a list of entries associated with a remaining portion of the assigned subgroup.

20 Claims, 6 Drawing Sheets

```
sample.jpg
photos/1976/January/sample.jpg
photos/1976/February/sample2.jpg
...
photos/1976/February/sample50000.jpg
....
photos/2006/January/sample.jpg
photos/2006/February/sample2.jpg
....
photos/2007/January/sample.jpg
photos/2007/February/sample2.jpg
...
photos/2008/January/sample.jpg
photos/2008/February/sample2.jpg
```

```
photos/1977/January/sample.jpg     <- First Marker
photos/1977/June/sample10.jpg      <- Second Marker
photos/1977/December/sample98.jpg  <- Third Marker
photos/1980/January/sample29.jpg   <- 32nd Marker
......
photos/2008/January/sample15.jpg   <- nth Marker
```

(56) References Cited

U.S. PATENT DOCUMENTS

2022/0050858 A1\* 2/2022 Karr .................. G06F 11/3466
2024/0028458 A1   1/2024 Gautam et al.
2024/0256568 A1\* 8/2024 Schmoll ................ G06F 3/067

OTHER PUBLICATIONS

Prosecution History from U.S. Appl. No. 17/872,307, dated Jun. 23, 2023 through Feb. 1, 2024, 21 pp.
Response to Extended Search Report dated Nov. 29, 2023, from counterpart European Application No. 23187471.0 filed Jul. 22, 2024, 23 pp.

\* cited by examiner

```
sample.jpg
photos/1976/January/sample.jpg
photos/1976/February/sample2.jpg
...
photos/1976/February/sample50000.jpg
....
photos/2006/January/sample.jpg
photos/2006/February/sample2.jpg
....
photos/2007/January/sample.jpg
photos/2007/February/sample2.jpg
....
photos/2008/January/sample.jpg
photos/2008/February/sample2.jpg
```

FIG. 1A

```
photos/1977/January/sample.jpg      <- First Marker
photos/1977/June/sample10.jpg       <- Second Marker
photos/1977/December/sample98.jpg   <- Third Marker
photos/1980/January/sample29.jpg    <- 32nd Marker
......
photos/2008/January/sample15.jpg    <- nth Marker
```

FIG. 1B

PARALLELIZATION OF INCREMENTAL BACKUPS

CROSS REFERENCE TO OTHER APPLICATIONS

This application is a continuation of U.S. patent application Ser. No. 17/872,307 entitled PARALLELIZATION OF INCREMENTAL BACKUPS filed Jul. 25, 2022 which is incorporated herein by reference for all purposes.

BACKGROUND OF THE INVENTION

S3 (Amazon Simple Storage Service) is an object storage where objects are stored in buckets. There are no limits to the number of objects that may be stored in a bucket. Each object may be up to 5 TB in size. S3 stores objects using a flat namespace. A list of the objects stored in a bucket may be obtained using an applications programming interface (API) associated with S3 (e.g., ListObjectsV2), but the API associated with S3 causes a bottleneck to occur because obtaining the list of objects stored in the bucket is a slow, single-threaded process. The API associated with S3 may return a list of a particular number of objects (e.g., 1000). As a result, the API associated with S3 may be repeatedly called until the API call does not return any more objects.

BRIEF DESCRIPTION OF THE DRAWINGS

Various embodiments of the invention are disclosed in the following detailed description and the accompanying drawings.

FIG. 1A illustrates an example of a flat namespace associated with an object storage bucket.

FIG. 1B illustrates an example of partition identifiers associated with an object storage bucket.

DETAILED DESCRIPTION

Figure 2:
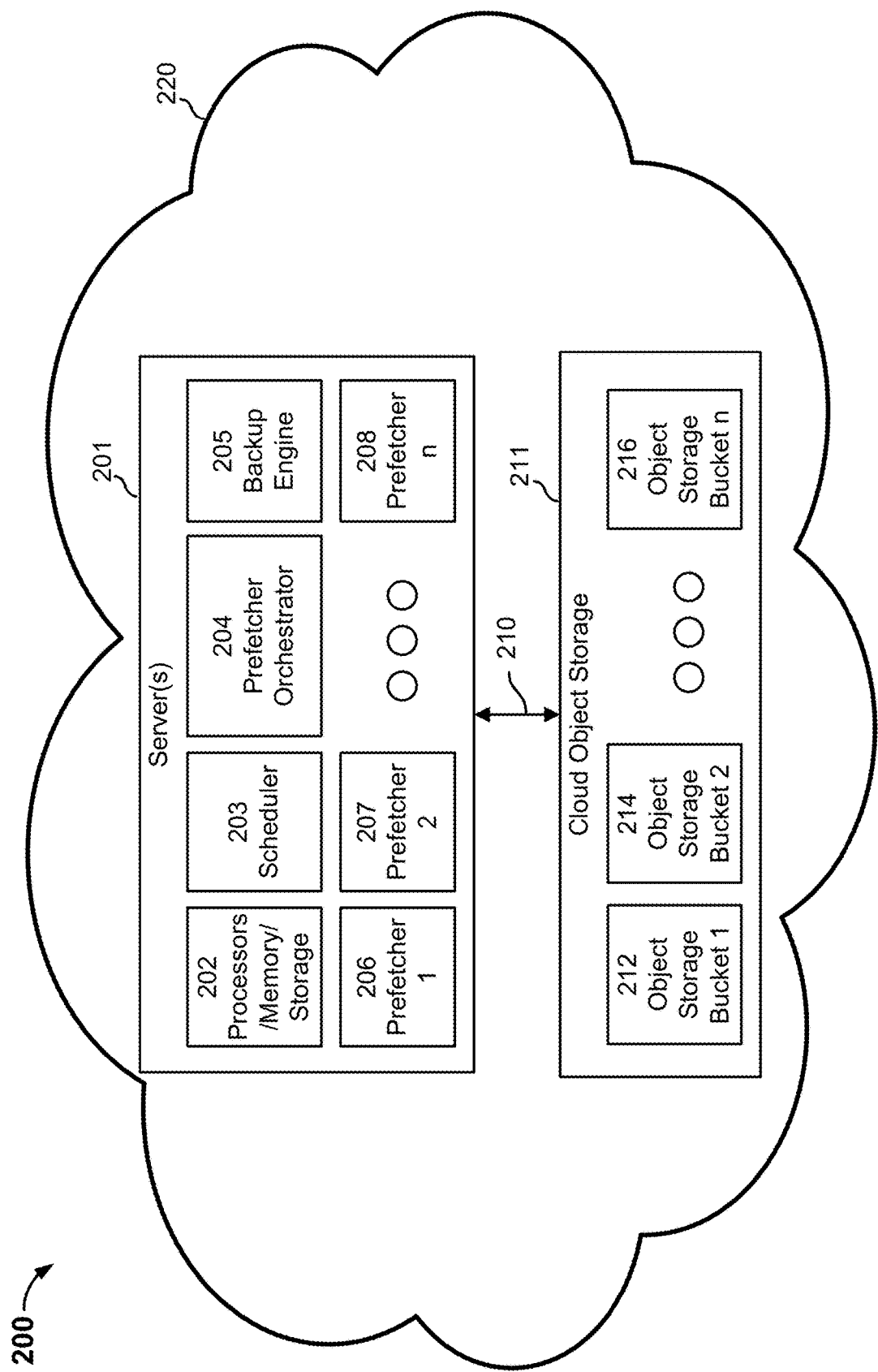
FIG. 2 is a block diagram illustrating an embodiment of a system for performing a backup of an object storage bucket.

A plurality of objects is stored in an object storage bucket (e.g., S3 bucket). A storage system performs a full backup of the object storage bucket by utilizing an API associated with the object storage (e.g., ListObjectV2, ListObjectVersions, etc.) to traverse the object storage bucket by obtaining a list of object(s) stored in the object storage bucket and reading the list to identify the object(s) stored in the object storage bucket. The storage system generates a checkpoint file associated with the full backup that indicates the objects included in the list. The checkpoint file associated with the full backup represents the order in which objects stored in the object storage bucket were encountered. The checkpoint file lists objects stored in the object storage bucket in lexicographically sorted order. The storage system subsequently ingests the data associated with the identified object(s). The storage system utilizes the API associated with the object storage to obtain a subsequent list of object(s) stored in the object storage bucket, in parallel, as the storage system is ingesting the data associated with the identified object(s). The above process of traversing the cloud object storage to identify a subsequent set of objects and ingesting data associated with a previous set of objects, in parallel, continues until an API call no longer returns a list of objects (e.g., the end of the cloud object storage has been reached). The storage system completes the full backup of object storage bucket by ingesting the data associated with a last list of objects stored in the object storage bucket.

An incremental backup of the object storage bucket is performed by identifying the one or more objects associated with the object storage bucket that have changed since the previous backup (e.g., a previous full backup or a previous incremental backup). A cloud storage provider associated with the object storage bucket may not offer an API that provides a change tracking function for an object storage bucket. A change associated with the object storage bucket may include an object being deleted after the previous backup, a change in metadata associated with an object after the previous backup, a change in data associated with the object after the previous backup, and a creation of an object after the previous backup.

The incremental backup of the object storage bucket may be performed by utilizing the API associated with the object storage (e.g., ListObjectV2, ListObjectVersions, etc.) to traverse the object storage bucket, identify the object(s) stored in the object storage bucket, and obtain metadata associated with the object(s) included in the object storage bucket. A checkpoint file associated with a previous backup (e.g., a previous full backup or a previous incremental backup) may be read and compared to the objects identified in the traversed object storage bucket to identify one or more differences between a current state of the object storage bucket and a previous state of the object storage bucket corresponding to the previous backup. The storage system may subsequently ingest the data associated with the one or more identified differences (e.g., object metadata and/or object data content). However, the plurality of objects is stored in the object storage bucket using a flat namespace. Other systems may walk the entire namespace to identify the object(s) stored in the object storage bucket before ingesting any of the data associated with the object(s) stored in the object storage bucket. The overall time to perform an incremental backup of the object storage bucket may take a long time to perform when there are many objects stored in the object storage bucket.

A technique to parallelize an incremental backup is disclosed herein. The disclosed technique reduces the amount of time needed to perform an incremental backup of object(s) stored in an object storage bucket. Although the techniques are described with respect to backup, the techniques disclosed herein may be applicable whenever a data management operation (e.g., backup, migration, replication, archive, etc.) is performed for a cohort of data that is provided from a first system to a second system.

The technique includes determining to initiate a backup of a current state of an object storage bucket. A storage system includes a scheduler. The scheduler may determine that a backup of the current state of the object storage bucket is to be performed according to one or more backup policies. In some embodiments, a backup policy indicates that the one or more objects are to be backed up on a periodic basis (e.g., hourly, daily, weekly, monthly, etc.), in response to a command from a user, etc. In some embodiments, a full backup of the current state of the object storage bucket is determined to be performed. In some embodiments, an incremental backup of the current state of the object storage bucket is determined to be performed.

Without an API associated with S3 that determines the number of objects in an object storage bucket and without the ability to directly access an object based on its ordinality in a list, the backup system is unable to directly determine how to subdivide the object storage bucket (e.g., divide the object storage bucket by 10K entries) from a current state object storage bucket. The technique further includes analyzing a previous state of the storage storing key-object entries to identify parallelization partition identifiers. A storage system reads a checkpoint file associated with a previous backup to identify the parallelization partition identifiers. A parallelization partition identifier corresponds to an object associated with the object storage bucket. In some embodiments, the partition identifiers are every kth entry of the checkpoint file associated with the previous backup (e.g., every 10,000 objects). The object storage bucket is comprised of a plurality of objects, each object associated with a corresponding key. The storage system determines the keys corresponding to the kth entries and designates the keys corresponding to the kth entries to be parallelization partition identifiers.

The object storage bucket is associated with a flat namespace. FIG. 1A illustrates an example of a flat namespace associated with an object storage bucket. By reading the checkpoint file associated with the previous backup, the storage system may determine the partition identifiers to be the partition identifiers illustrated in FIG. 1B. A subgroup may correspond to objects included in the object storage bucket that are between partition identifiers. For example, a subgroup may correspond to the objects included between 'photos/1977/January/sample.jpg'" to 'photos/1977/June/sample10.jpg'. In some embodiments, an object corresponding to a beginning boundary of the subgroup is included in the subgroup and an object corresponding to an ending boundary of the subgroup is included in a subsequent subgroup. In some embodiments, an object corresponding to a beginning boundary of the subgroup is included in a previous subgroup and an object corresponding to an ending boundary of the subgroup is included in the subgroup. Each of the subgroups is assigned a corresponding prefetcher. For example, a first prefetcher associated with a first subgroup may be assigned to walk a range of '{ }' to 'photos/1977/January/sample.jpg' and a second prefetcher associated with a second subgroup may be assigned to walk a range of 'photos/1977/January/sample.jpg' to 'photos/1977/June/sample10.jpg'.

The technique further includes utilizing at least a portion of the parallelization partition identifiers as boundaries between subgroups of the key-object entries processed in parallel to perform the backup of the current state of the storage. The object namespace associated with the object storage bucket is divided into a plurality of subgroups to parallelize the object storage bucket walk. In some embodiments, an entire partition identifier is used as a boundary between subgroups. For example, 'photos/1977/January/sample.jpg' may be used as a boundary between subgroups.

A prefetcher orchestrator assigns a corresponding prefetcher to each of the subgroups. The prefetchers, in parallel, discover the object(s) associated with a corresponding subgroup. In some embodiments, a prefetcher utilizes the API associated with the object storage to list the objects associated with a subgroup until a parallelization partition identifier associated with a subsequent group is obtained. For example, a beginning boundary of a first subgroup may be a " " value or a null value and an ending boundary of the first subgroup may be an object-key pair having a key of "object10000". A beginning boundary for a second subgroup may be the object-key pair having the key of "object10000". The API associated with the object storage may list 1000 objects at a time. The storage system may continue to utilize the API associated with the object storage until the returned list includes a key of "object10000". In some embodiments, a prefetcher utilizes the API associated with object storage to list the objects associated with a subgroup until the API associated with the object storage does not return any more objects (e.g., an end boundary for the last subgroup is a " " value or a null value).

Each time the API associated with the object storage returns a list of objects, the prefetcher associated with a subgroup stores the entries associated with the list in memory. The prefetcher associated with the subgroup analyzes the entries to determine if they include a partition identifier associated with a subsequent subgroup. In response to a determination that the entries do not include the partition identifier associated with the subsequent subgroup, the prefetcher continues to utilize the API associated with the object storage to obtain a list of objects for the subgroup. In response to a determination that the entries include the partition identifier associated with the subsequent subgroup, the prefetcher updates the checkpoint file associated with the current backup to include the entries stored in memory. The checkpoint file associated with the backup is updated to store the entries in lexicographically sorted order.

However, in some embodiments, one or more prefetchers associated with one or more subsequent subgroups finish traversing the one or more subsequent subgroups before a prefetcher associated with a previous subgroup finishes traversing the previous subgroup. The entries fetched by the one or more prefetchers associated with one or more subsequent subgroups are stored in memory. The entries fetched by the one or more prefetchers associated with one or more subsequent subgroups are not included in the checkpoint file associated with the backup until the prefetcher associated with the previous subgroup finishes traversing the previous subgroup and updates the checkpoint file. This ensures that entries included in the checkpoint file are listed in lexicographically sorted order.

Each subgroup has an expected number of entries (e.g., k entries). In some embodiments, the prefetcher reaches the first entry of the next subgroup in an expected manner (e.g., k entries+a threshold number of entries) and updates the checkpoint file. In some embodiments, the prefetcher does not reach the first entry of the next subgroup in an expected manner (e.g., traversed more than k+a threshold number of entries). In response to determining that the subgroup includes more entries than expected, the prefetcher stops traversing the assigned subgroup and updates the checkpoint file to include the entries associated with a partial walk of the subgroup that are stored in memory. A prefetcher orchestrator further subdivides the remaining portion of the subgroup associated to that prefetcher into a plurality of subsets.

In some embodiments, a portion of a partition identifier is used as a boundary. The prefetcher orchestrator may utilize the checkpoint file associated with the previous backup to identify delimiters associated with a subgroup. The prefetcher orchestrator determines common prefixes among the remaining objects associated with the subgroup based on the identified delimiters. For example, the prefetcher orchestrator may utilize 'photos/2007/' FIG. 1A as a boundary between subsets and/or between a last subset and a subsequent subgroup.

The prefetcher orchestrator assigns prefetchers to the subsets. The prefetchers walk the subsets until the remaining portion of the subgroup is traversed. In some embodiments, a subset of a subgroup is further subdivided.

In response to a checkpoint file being updated by a prefetcher, the storage system reads a portion of the checkpoint file associated with the previous backup corresponding to objects assigned to the prefetcher (e.g., until the partition identifier associated with the subsequent subgroup is encountered) and compares the objects included in the read portion of the checkpoint file associated with the previous backup to the objects included in the updated portion of the checkpoint file associated with the current backup. The objects included in the checkpoint file associated with the previous backup and the checkpoint file associated with the current backup are listed in lexicographically sorted order. The storage system may identify one or more differences between a current state of the object storage bucket and a previous state of the object storage bucket corresponding to the previous backup based on the comparison. In response to identifying one or more differences, the storage system ingests the data associated with the one or more identified differences (e.g., object metadata and/or object data content). The storage system may ingest data associated with the one or more identified differences as one or more other prefetchers continue to walk their assigned subgroups. In some embodiments, the storage system determines there are no differences between the read portion of the checkpoint file associated with the previous backup and the objects included in the updated portion of the checkpoint file.

The disclosed technique reduces the amount of time needed to perform an incremental backup of object(s) stored in an object storage bucket because the object storage bucket is divided into a plurality of subgroups and the new data associated with the plurality of subgroups (new object content data and/or new object metadata) may be ingested in parallel.

FIG. 2 is a block diagram illustrating an embodiment of a system for performing a backup of an object storage bucket. In the example shown, system 200 includes one or more servers 201 coupled to cloud object storage 211 in cloud environment 220 via connection 210. Cloud environment 220 may be a public cloud, a private cloud, a hybrid cloud, etc. Cloud storage 211 may be provide by a cloud provider (e.g., Amazon Web Services™, Microsoft™ Azure, Google Cloud™, etc.).

The one or more servers 201 (e.g., one or more EC2 instances) may be part of a data plane associated with a data management as a server (DMaaS) provider. The one or more servers 210 may be associated with corresponding processors, memory, and storage 202. In some embodiments, the one or more servers 201 are on-prem at a datacenter.

The one or more servers 201 include scheduler 203. Scheduler 203 may determine to initiate a backup of a current state of one of the object storage buckets 212, 214, 216. Scheduler 203 may determine that a backup of the current state of the object storage bucket is to be performed according to one or more backup policies. In some embodiments, a backup policy indicates that the one or more objects are to be backed up on a periodic basis (e.g., hourly, daily, weekly, monthly, etc.), in response to a command from a user, etc. In some embodiments, a full backup of the current state of the object storage bucket is determined to be performed. In some embodiments, an incremental backup of the current state of the object storage bucket is determined to be performed.

The one or more servers 201 include backup engine 205. Backup engine 205 analyzes a previous state of one of the object storage buckets to identify parallelization partition identifiers. The one or more servers 201 store a checkpoint file associated with a previous backup. Backup engine 205 reads the checkpoint file associated with the previous backup to identify the parallelization partition identifiers. A parallelization partition identifier corresponds to an object associated with the object storage bucket (e.g., an object key). In some embodiments, the partition identifiers are every kth entry of the checkpoint file associated with the previous backup (e.g., every 10,000 objects). Object storage buckets 212, 214, . . . , 216 are flat namespaces. An object storage bucket is comprised of a plurality of objects, each object associated with a corresponding key. Backup engine 205 determines the keys corresponding to the kth entries and designates the keys corresponding to the kth entries to be parallelization partition identifiers.

Backup engine 205 utilizes at least a portion of the parallelization partition identifiers as boundaries between subgroups of the key-object entries processed in parallel to perform the backup of the current state of an object storage bucket. The object namespace associated with the object storage bucket is divided into a plurality of subgroups to parallelize the object storage bucket walk. As a result, a queue of subgroups may be generated. Prefetcher orchestrator 204 assigns a corresponding prefetcher to each of the subgroups. The one or more servers 201 includes prefetchers 206, 207, . . . , 208. Although three prefetchers are depicted, the one or more servers 201 may include 1:n prefetchers. The prefetchers 206, 207, . . . , 208 may be scaled up or down depending upon system resources, the number of subgroups, network bandwidth, etc. In some embodiments, the number of subgroups in the queue is less than the number of prefetchers. In some embodiments, the number of subgroups in the queue is equal to the number of prefetchers. In some embodiments, the number of subgroups in the queue is greater than the number of prefetchers. The queue may be a priority queue (e.g., first in first out queue). Prefetcher 206 may be assigned to a first subgroup. After prefetcher 206 has finished discovering object(s) associated with the first subgroup, prefetcher orchestrator 204 may assign the prefetcher 206 to a next subgroup in the queue. In some embodiments, the next subgroup in the queue is a subset of a subgroup.

The prefetchers 206, 207, . . . , 208, in parallel, discover the object(s) associated with a corresponding subgroup. In some embodiments, a prefetcher utilizes the API associated with cloud object storage 211 to list the objects associated with a subgroup until a parallelization partition identifier associated with a subsequent group is obtained. In some embodiments, a prefetcher utilizes the API associated with cloud object storage 211 to list the objects associated with a subgroup until the API associated with cloud object storage 211 does not return any more objects (e.g., an end boundary for the last subgroup is a " " value or a null value.

Each time the API associated with cloud object storage 211 returns a list of objects for a subgroup, the prefetcher associated with the subgroup stores the entries associated with the list in memory 202. The prefetcher associated with the subgroup analyzes the entries to determine if they include a partition identifier associated with a subsequent subgroup. In response to a determination that the entries do not include the partition identifier associated with the subsequent subgroup, the prefetcher continues to utilize the API associated with cloud object storage 211 to obtain a list of objects for the subgroup. In response to a determination that the entries include the partition identifier associated with the subsequent subgroup, the prefetcher updates the checkpoint file associated with the current backup to include the entries stored in memory 202. The checkpoint file associated with the backup is updated to store the entries in lexicographically sorted order.

However, in some embodiments, one or more prefetchers associated with one or more subsequent subgroups finish traversing the one or more subsequent subgroups before a prefetcher associated with a previous subgroup finishes traversing the previous subgroup. The entries fetched by the one or more prefetchers associated with one or more subsequent subgroups are stored in memory 202. The entries fetched by the one or more prefetchers associated with one or more subsequent subgroups are not included in the checkpoint file associated with the backup until the prefetcher associated with the previous subgroup finishes traversing the previous subgroup and updates the checkpoint file. This ensures that entries included in the checkpoint file are listed in lexicographically sorted order. For example, the entries fetched by the prefetchers 207, 208 are not included in the checkpoint file associated with the current backup until prefetcher 206 finishes traversing the previous subgroup and updates the checkpoint file associated with the current backup.

Each subgroup has an expected number of entries (e.g., k entries). In some embodiments, the prefetcher reaches the first entry of the next subgroup in an expected manner (e.g., k entries+a threshold number of entries) and updates the checkpoint file. In some embodiments, the prefetcher does not reach the first entry of the next subgroup in an expected manner (e.g., traversed or walked more than k+a threshold number of entries). In response to determining that the subgroup includes more entries than expected, the prefetcher stops traversing the assigned subgroup and updates the checkpoint file to include the entries associated with a partial walk of the subgroup that are stored in memory 202. Prefetcher orchestrator 204 further subdivides the remaining portion of the subgroup associated to that prefetcher into a plurality of subsets. A portion of a partition identifier is used as a boundary between subgroups. Prefetcher orchestrator 204 may utilize the checkpoint file associated with the previous backup to identify delimiters associated with a subgroup. Prefetcher orchestrator 204 determines common prefixes among the remaining objects associated with the subgroup based on the identified delimiters to divide the subgroup into a plurality of subsets. Prefetcher orchestrator 204 assigns prefetchers to the subsets. In some embodiments, the prefetcher assigned to walk the subgroup is assigned to walk one of the subsets. The prefetchers walk the subsets until the remaining portion of the subgroup is traversed. In some embodiments, a subset of a subgroup is further subdivided.

In some embodiments, in response to a checkpoint file being updated by a prefetcher, backup engine 205 reads a portion of the checkpoint file associated with the previous backup corresponding to objects assigned to the prefetcher (e.g., until the partition identifier associated with the subsequent subgroup is encountered) and compares the objects included in the read portion of the checkpoint file associated with the previous backup to the objects included in the updated portion of the checkpoint file associated with the current backup. The objects included in the checkpoint file associated with the previous backup and the checkpoint file associated with the current backup are listed in lexicographically sorted order. Backup engine 205 may identify one or more differences between a current state of the object storage bucket and a previous state of the object storage bucket corresponding to the previous backup based on the comparison. In response to identifying one or more differences, backup engine 205 ingests the data associated with the one or more identified differences (e.g., object metadata and/or object data content). Backup engine 205 may ingest data associated with the one or more identified differences as one or more other prefetchers continue to walk their assigned subgroups. In some embodiments, backup engine 20 determines there are no differences between the read portion of the checkpoint file associated with the previous backup and the objects included in the updated portion of the checkpoint file associated with the current backup.

Figure 3:
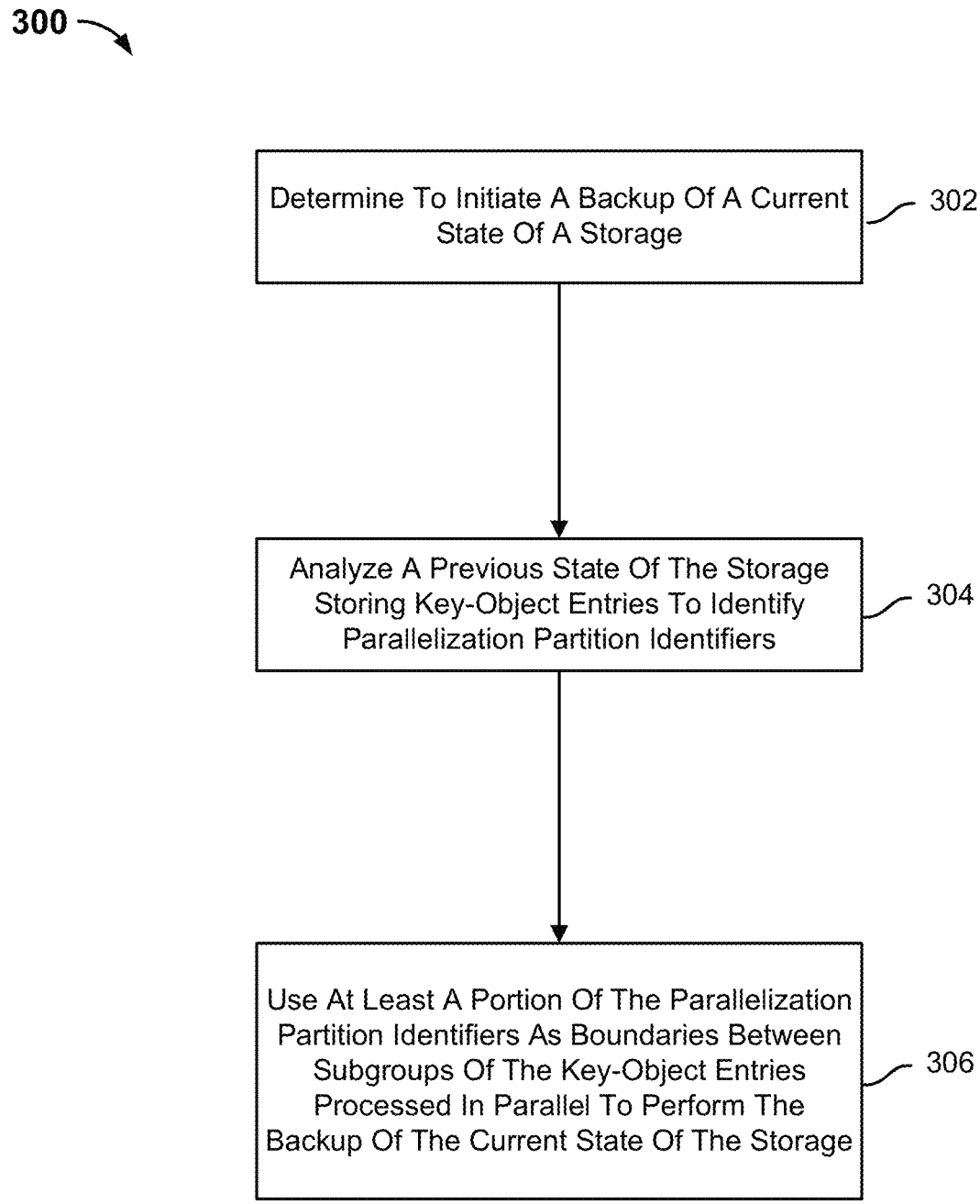
FIG. 3 is a flow diagram illustrating a process for performing an incremental backup in accordance with some embodiments.

FIG. 3 is a flow diagram illustrating a process for performing an incremental backup in accordance with some embodiments. In the example shown, process 300 may be implemented by a storage system, such as one or more servers 201.

At 302, a backup of a current state of a storage is determined to be initiated. A storage system includes a scheduler. The scheduler may determine that a backup of the current state of the object storage bucket is to be performed according to one or more backup policies. In some embodiments, a backup policy indicates that the one or more objects are to be backed up on a periodic basis (e.g., hourly, daily, weekly, monthly, etc.), in response to a command from a user, etc. In some embodiments, a full backup of the current state of the object storage bucket is determined to be performed. In some embodiments, an incremental backup of the current state of the object storage bucket is determined to be performed.

At 304, a previous state of the storage storing key-object entries is analyzed to identify parallelization partition identifiers. A storage system obtains a checkpoint file associated with a previous backup to identify the parallelization partition identifiers. The checkpoint file associated with a previous backup of the storage is utilized to identify key-object entries corresponding to objects as the boundaries between the subgroups. A parallelization partition identifier corresponds to an object associated with the object storage bucket. In some embodiments, the partition identifiers are every kth entry of the checkpoint file associated with the previous backup (e.g., every 10,000 objects). The object storage bucket is comprised of a plurality of objects, each object associated with a corresponding key. The storage system determines the keys corresponding to the kth entries and designates the keys corresponding to the kth entries to be parallelization partition identifiers.

At 306, at least a portion of the parallelization partition identifiers are used as boundaries between subgroups of the key-object entries processed in parallel to perform the backup of the current state of the storage. The object namespace associated with the object storage bucket is divided into a plurality of subgroups to parallelize the object storage bucket walk. In some embodiments, an entire partition identifier is used as a boundary between subgroups. For example, 'photos/1977/January/sample.jpg' of FIG. 1B may be used as a boundary between subgroups.

A prefetcher orchestrator assigns a corresponding prefetcher to each of the subgroups. The prefetchers, in parallel, discover the object(s) associated with a corresponding subgroup. In some embodiments, a prefetcher utilizes the API associated with the cloud object storage to list the objects associated with a subgroup until a parallelization partition identifier associated with a subsequent group is obtained. For example, a beginning boundary of a first subgroup may be a " " value or a null value and an ending boundary of the first subgroup may be an object-key pair having a key of "object10000". A beginning boundary for a second subgroup may be the object-key pair having the key of "object10000". The API associated with the cloud object storage may list 1000 objects at a time. The storage system may continue to utilize the API associated with the cloud object storage until the returned list includes a key of "object10000". The ending boundary for a last subgroup may be a " " value or a null value.

Each time the API associated with the cloud object storage returns a list of objects, the prefetcher associated with a subgroup stores the entries associated with the list in memory. The prefetcher associated with the subgroup analyzes the entries to determine if they include a partition identifier associated with a subsequent subgroup. In response to a determination that the entries do not include the partition identifier associated with the subsequent subgroup, the prefetcher continues to utilize the API associated with cloud object storage to obtain a list of objects for the subgroup. In response to a determination that the entries include the partition identifier associated with the subsequent subgroup, the prefetcher updates the checkpoint file associated with the current backup to include the entries stored in memory. The checkpoint file associated with the backup is updated to store the entries in lexicographically sorted order.

However, in some embodiments, one or more prefetchers associated with one or more subsequent subgroups finish traversing the one or more subsequent subgroups before a prefetcher associated with a previous subgroup finishes traversing the previous subgroup. The entries fetched by the one or more prefetchers associated with one or more subsequent subgroups are stored in memory. The entries fetched by the one or more prefetchers associated with one or more subsequent subgroups are not included in the checkpoint file associated with the backup until the prefetcher associated with the previous subgroup finishes traversing the previous subgroup and updates the checkpoint file. This ensures that entries included in the checkpoint file are listed in lexicographically sorted order.

Each subgroup has an expected number of entries (e.g., k entries). In some embodiments, the prefetcher reaches the first entry of the next subgroup in an expected manner (e.g., k entries+a threshold number of entries) and updates the checkpoint file. In some embodiments, the prefetcher does not reach the first entry of the next subgroup in an expected manner (e.g., traversed or walked more than k+a threshold number of entries). In response to determining that the subgroup includes more entries than expected, the prefetcher stops traversing the assigned subgroup and updates the checkpoint file to include the entries associated with a partial walk of the subgroup that are stored in memory. A prefetcher orchestrator further subdivides the remaining portion of the subgroup associated to that prefetcher into a plurality of subsets.

In some embodiments, a portion of a partition identifier is used as a boundary between subgroups. The prefetcher orchestrator may utilize the checkpoint file associated with the previous backup to identify delimiters associated with a subgroup. The prefetcher orchestrator determines common prefixes among the remaining objects associated with the subgroup based on the identified delimiters. For example, the prefetcher orchestrator may utilize 'photos/2007/' of FIG. 1A as a boundary between subsets and/or between a last subset and a subsequent subgroup.

The prefetcher orchestrator assigns prefetchers to the subsets. The prefetchers walk the subsets until the remaining portion of the subgroup is traversed. In some embodiments, a subset of a subgroup is further subdivided.

In response to a checkpoint file being updated by a prefetcher, the storage system reads a portion of the checkpoint file associated with the previous backup corresponding to objects assigned to the prefetcher (e.g., until the partition identifier associated with the subsequent subgroup is encountered) and compares the objects included in the read portion of the checkpoint file associated with the previous backup to the objects included in the updated portion of the checkpoint file associated with the current backup. The objects included in the checkpoint file associated with the previous backup and the checkpoint file associated with the current backup are listed in lexicographically sorted order. The storage system may identify one or more differences between a current state of the object storage bucket and a previous state of the object storage bucket corresponding to the previous backup based on the comparison. In response to identifying one or more differences, the storage system ingests the data associated with the one or more identified differences (e.g., object metadata and/or object data content). The storage system may ingest the data associated with the one or more identified differences as one or more other prefetchers continue to walk their assigned subgroup. In some embodiments, the storage system determines there are no differences between the read portion of the checkpoint file associated with the previous backup and the objects included in the updated portion of the checkpoint file.

Figure 4:
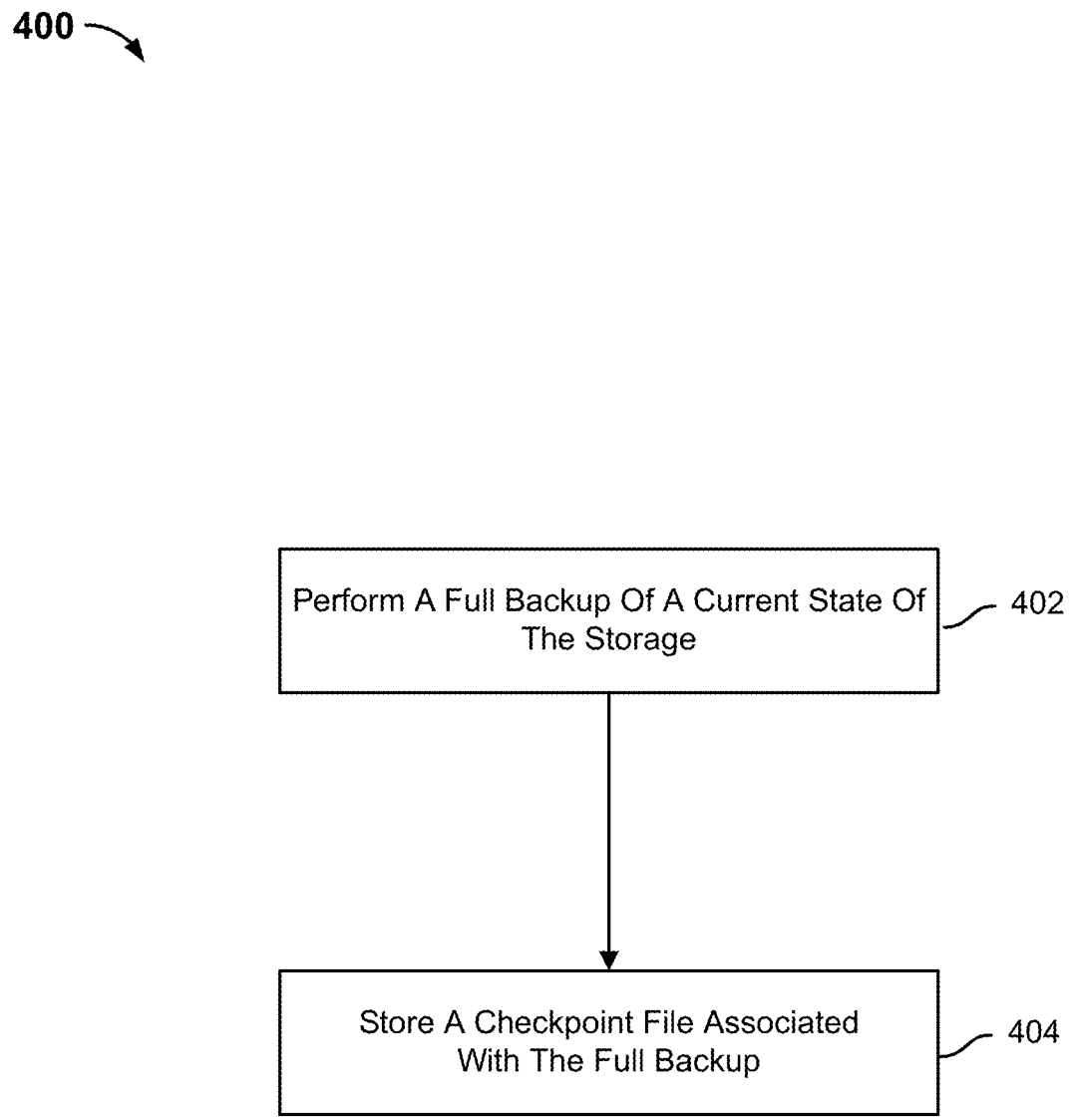
FIG. 4 is a flow diagram illustrating a process for generating a checkpoint file in accordance with some embodiments.

FIG. 4 is a flow diagram illustrating a process for generating a checkpoint file in accordance with some embodiments. In the example shown, process 400 may be implemented by a storage system, such as one or more cloud servers 201.

At 402, a full backup of a current state of a storage is performed. A prefetcher associated with the storage system utilizes an API associated with a cloud object storage (e.g., ListObjectV2, ListObjectVersions, etc.) to traverse the object storage bucket and reads a list of objects returned by the API associated with the cloud object storage to identify a first set of object(s) stored in the object storage bucket. The prefetcher updates a checkpoint file to include the first set of objects. In response to the checkpoint file being updated, a backup engine associated with the storage system ingests the data associated with the object(s) included in the first set.

The API associated with the cloud object storage returns a finite number of objects each time the API is called. As the backup engine associated with the storage system is ingesting the data associated with the identified objects included in the first set, the prefetcher, in parallel, utilizes the API associated with the cloud object storage to traverse the object storage bucket and read a subsequent list of objects returned by the API associated with the cloud object storage to identify a second set of objects stored in the object storage bucket. The prefetcher updates the checkpoint file to include the objects included in the second set.

In some embodiments, the backup engine is still ingesting data associated with object(s) included in the first set when the prefetcher updates the checkpoint file to include the objects included in the second set. Objects stored in the checkpoint file in lexicographical order. As a result, the backup engine ingests the data associated with objects included in the second set after ingesting data associated with objects included in the first set. In some embodiments, the backup engine finished ingesting the data associated with the object(s) included in the first set when the prefetcher updates the checkpoint file to include the objects included in the second set. In response, the backup engine ingests the data associated with the objects included in the second set.

The above process of traversing the cloud object storage to identify a subsequent set of objects and ingesting data associated with a previous set of objects, in parallel, continues until an API call no longer returns a list of objects (e.g., the end of the cloud object storage has been reached). The storage system completes the full backup of object storage bucket by ingesting the data associated with a last list of objects stored in the object storage bucket.

At 404, a checkpoint file with the full backup is stored. The checkpoint file associated with the full backup represents the order in which the objects stored in the object storage bucket were encountered. The checkpoint file lists objects stored in the object storage bucket in lexicographically sorted order.

Figure 5:
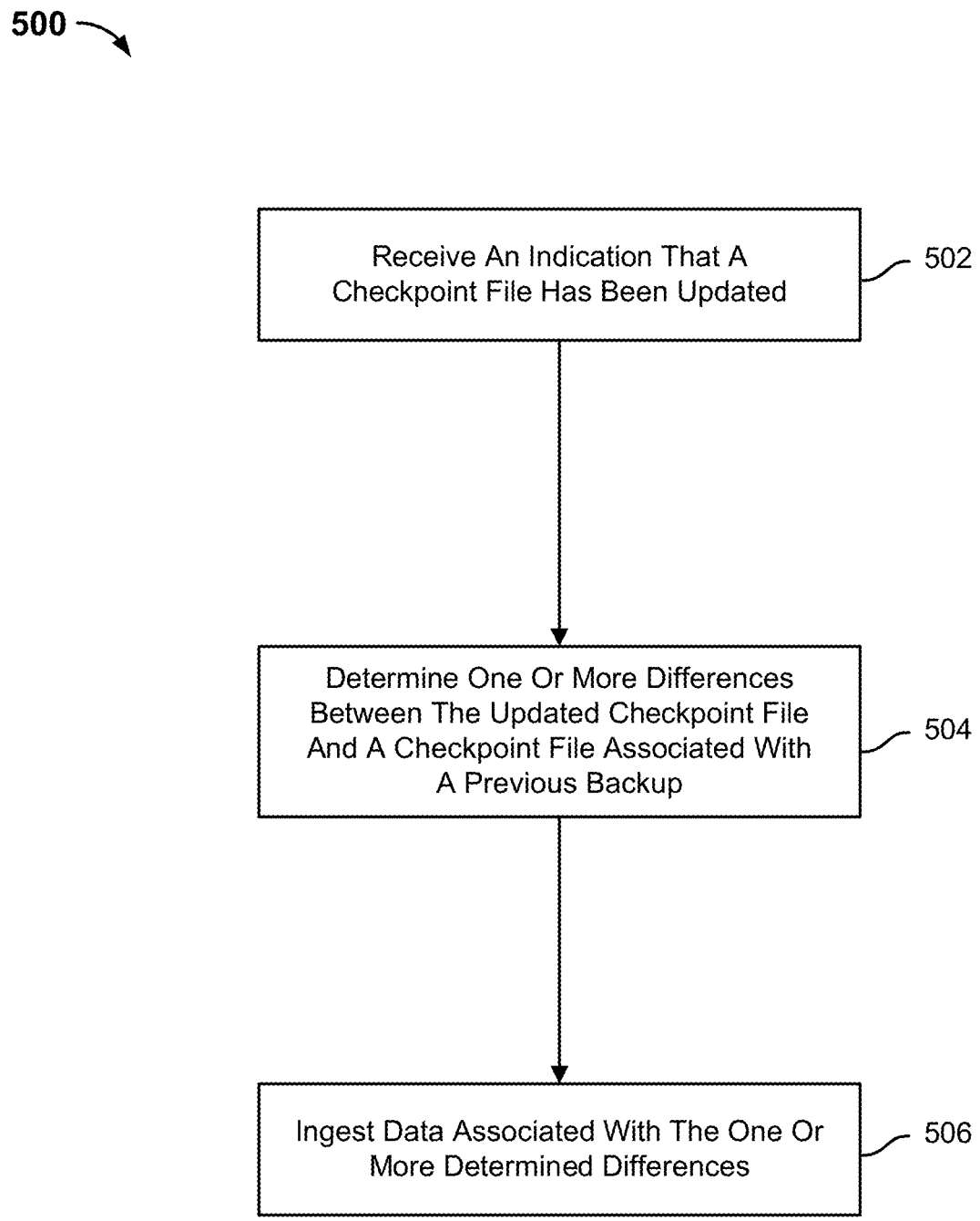
FIG. 5 is a flow diagram illustrating a process for performing a backup in accordance with some embodiments.

FIG. 5 is a flow diagram illustrating a process for performing a backup in accordance with some embodiments. In the example shown, process 500 may be implemented by a backup engine, such as backup engine 205. In some embodiments, process 500 is implemented to perform some of step 306 of process 300. Process 500 may be performed when a prefetcher finishes traversing an assigned subgroup.

At 502, an indication that a checkpoint file has been updated is received. A prefetcher utilizes an API associated with a cloud object storage to obtain a list of objects associated with a subgroup assigned to the prefetcher. The list of objects is stored in memory while the prefetcher is traversing the assigned subgroup. In response to the prefetcher determining that an entry of the obtained list of objects includes a partition identifier associated with a subsequent subgroup, the prefetcher updates the checkpoint file to include entries corresponding to the list of objects stored in memory except the entry corresponding to the partition identifier associated with the subsequent subgroup and any entries, if stored in memory, that are sequentially after the entry corresponding to the partition identifier associated with the subsequent subgroup. Any entries that are sequentially after the entry corresponding to the partition identifier associated with the subsequent subgroup may be discarded (e.g., deleted from memory).

At 504, one or more differences between the updated checkpoint file and a checkpoint file associated with the previous backup are determined. A backup agent obtains a checkpoint file associated with a previous backup. The backup agent reads a portion of the checkpoint file associated with the previous backup corresponding to objects assigned to the prefetcher (e.g., until the partition identifier associated with the subsequent subgroup is encountered) and compares the objects included in the read portion of the checkpoint file associated with the previous backup to the objects included in the updated portion of the checkpoint file associated with the current backup. The objects included in the checkpoint file associated with the previous backup and the checkpoint file associated with the current backup are listed in lexicographically sorted order. The storage system may identify one or more differences between a current state of the object storage bucket and a previous state of the object storage bucket corresponding to the previous backup based on the comparison.

At 506, data associated with the one or more determined differences is ingested. The data associated with the one or more determined differences may include object metadata and/or object data content. In some embodiments, the data associated with the one or more determined differences may indicate that an object was deleted after the previous backup.

In some embodiments, the data associated with the one or more determined differences includes metadata associated with an object changed after the previous backup, the change data associated with the object after the previous backup, and/or the object metadata and object content data associated with an object that was created after the previous backup.

Figure 6:
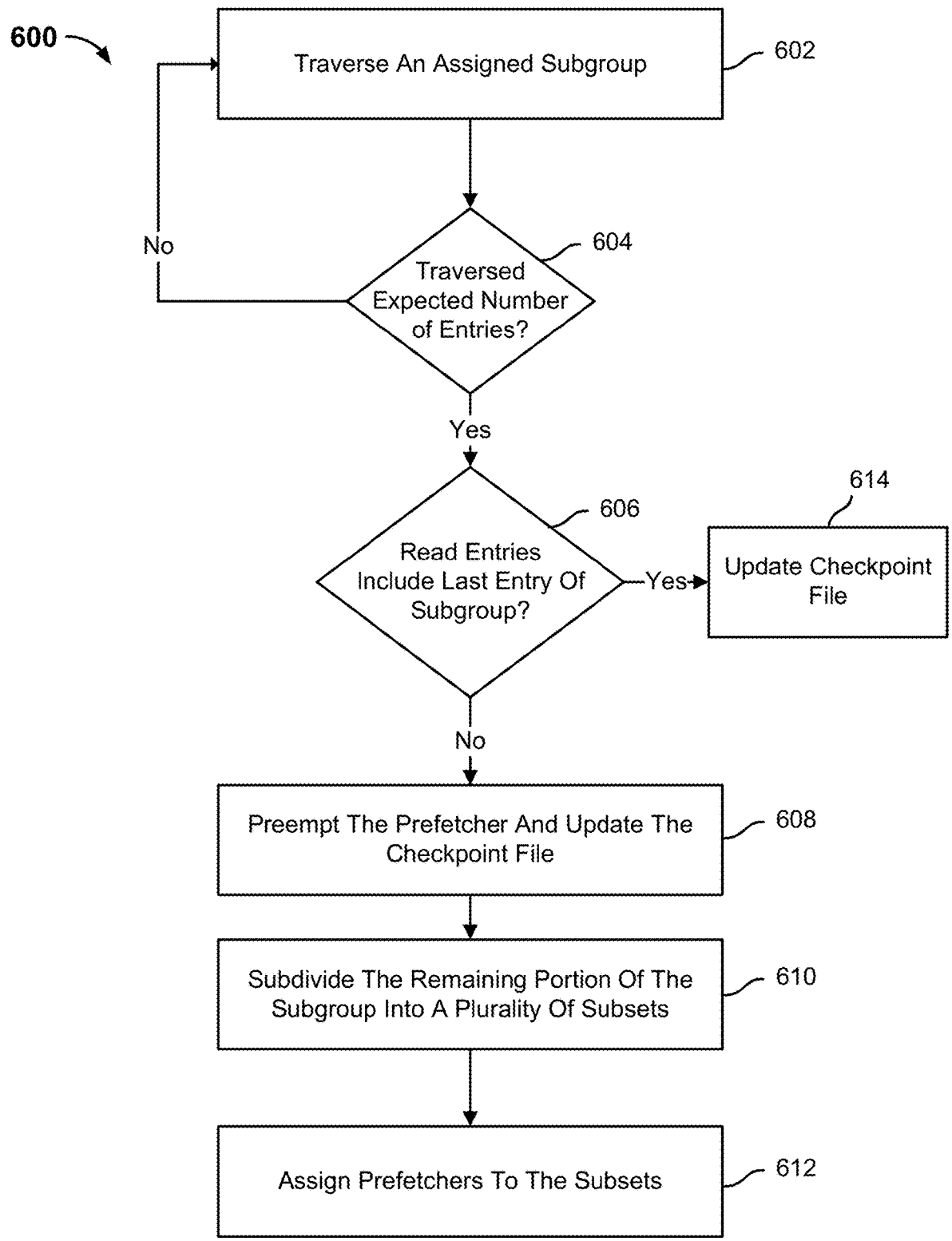
FIG. 6 is a flow diagram illustrating a process for traversing an assigned subgroup in accordance with some embodiments.

FIG. 6 is a flow diagram illustrating a process for traversing an assigned subgroup in accordance with some embodiments. In the example shown, process 600 may be implemented by a storage system, such as one or more servers 201. In some embodiments, process 600 is implemented to perform some of step 306 of process 300.

At 602, an assigned subgroup is traversed. An assigned subgroup may have an associated starting partition identifier and an ending partition identifier. In some embodiments, the ending partition identifier is the starting partition identifier associated with a subsequent subgroup. In some embodiments, the ending partition is a " " value or a null value (e.g., for the last subgroup). An assigned subgroup is traversed by utilizing an API associated with a cloud object storage to obtain a list of objects stored in an object storage bucket. The list of objects includes one or more entries. Each entry corresponds to an object stored in the object storage bucket. The API associated with the cloud object storage may be configured to return a particular number of results (e.g., 1000) each time the API is invoked.

At 604, it is determined whether an expected number of entries associated with the subgroup have been traversed. Each subgroup is expected to have a particular number of entries (e.g., k entries+a threshold number of entries). In response to a determination that the expected number of entries associated with the subgroup have been traversed, process 600 proceeds to 606. In response to a determination that the expected number of entries associated with the subgroup have not been traversed, process 600 returns to 602.

At 606, it is determined whether the read entries associated with the subgroup include the last entry of the subgroup. The last entry of the subgroup has a partition identifier that is the same partition identifier as the first entry of the subsequent subgroup. In response to a determination that the read entries associated with the subgroup include the last entry of the subgroup, process 600 proceeds to 614. In response to a determination that the read entries associated with the subgroup do not include the last entry of the subgroup, process 600 proceeds to 608.

At 608, the prefetcher is preempted and the checkpoint file is updated. The prefetcher stops utilizing the API associated with the cloud object storage to obtain a list of entries associated with an assigned subgroup. The previously obtained plurality of entries associated with the subgroup are stored in memory. The prefetcher updates the checkpoint file to include the plurality of entries associated with the subgroup that are stored in memory.

At 610, the remaining portion of the subgroup is subdivided into a plurality of subsets. A prefetcher orchestrator further subdivides the remaining portion of the subgroup is subdivided into a plurality of subsets. The prefetcher orchestrator may utilize the checkpoint file associated with the previous backup and the checkpoint file associated with the current backup to determine how to subdivide the remaining portion of the subgroup. The prefetcher orchestrator may determine the last entry included in the checkpoint file associated with the current backup. The prefetcher orchestrator may determine if that entry is also included in the checkpoint file associated with the previous backup. In response to a determination that entry is in both checkpoint files, then the prefetcher orchestrator may determine the number of entries between that entry and the last entry for the subgroup in the checkpoint file associated with the previous backup.

In response to a determination that the entry is not in both checkpoint files, then the prefetcher orchestrator determines the entry that precedes the last entry that is included in both checkpoint files. The prefetcher orchestrator may determine the number of entries between the determined entry and the last entry for the subgroup in the checkpoint file associated with the previous backup.

The prefetcher orchestrator may divide the determined number of entries by 2, 3, 4, . . . , or n to determine the number of entries per smaller subgroup. The prefetcher orchestrator may utilize the checkpoint file associated with the previous backup to identify the objects that correspond to the boundaries of the small subgroups. For example, the prefetcher orchestrator may identify delimiters associated with a subgroup (e.g., "/") to use as boundaries for the subsets. The prefetcher orchestrator determines common prefixes among the remaining objects associated with the subgroup based on the identified delimiters. The objects listed in FIG. 1A may correspond to a remaining portion of an assigned subgroup. The prefetcher orchestrator may subdivide the subgroup into subsets of "photos/1976/" . . . "photos/2006/", "photos/2007/", and "photos/2008".

At 612, prefetchers are assigned to the subsets. In some embodiments, the prefetcher assigned to the subgroup is assigned to one of the subsets. The prefetchers walk an assigned subset.

At 614, the checkpoint file is updated. The checkpoint file associated with the backup is updated to store the entries associated with the assigned subgroup in lexicographically sorted order.

In some embodiments, the prefetcher finishes traversing an assigned subgroup before a prefetcher associated with a previous subgroup finishes traversing the previous subgroup. The entries associated with the assigned subgroup are stored in memory until the prefetcher associated with the previous subgroup finishes traversing the previous subgroup and updates the checkpoint file. Afterwards, the prefetcher may update the entries associated with the assigned subgroup. This ensures that entries included in the checkpoint file are listed in lexicographically sorted order.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    traversing, by a prefetcher, an assigned subgroup that includes a plurality of entries;
    determining that an expected number of entries associated with the assigned subgroup have been traversed;
    in response to determining that expected number of entries associated with the assigned subgroup have been traversed, determining that a last read entry associated with the assigned subgroup does not correspond to a last entry associated with the assigned subgroup; and
    preempting the prefetcher by stopping the prefetcher from obtaining a list of entries associated with a remaining portion of the assigned subgroup.

2. The method of claim 1, wherein the assigned subgroup includes a starting partition identifier and an ending partition identifier.

3. The method of claim 2, wherein the ending partition identifier is a second partition identifier associated with a different subgroup.

4. The method of claim 1, wherein the assigned subgroup is traversed utilizing an applications programming interface associated with a cloud object storage to obtain the list of objects stored in an object storage bucket.

5. The method of claim 1, wherein the last entry associated with the assigned subgroup corresponds to a partition identifier of a first entry associated with a subsequent subgroup.

6. The method of claim 1, further comprising updating a checkpoint file.

7. The method of claim 6, wherein entries associated with the assigned subgroup are stored in the checkpoint file in lexicographically sorted order.

8. The method of claim 6, wherein the checkpoint file is updated to include the plurality of entries associated with the assigned subgroup.

9. The method of claim 1, further comprising subdividing the remaining portion of the assigned subgroup into a plurality of subsets.

10. The method of claim 9, wherein the remaining portion of the assigned subgroup is subdivided into the plurality of subsets utilizing a checkpoint file associated with a previous backup and a checkpoint file associated with a current backup.

11. The method of claim 10, wherein subdividing the remaining portion of the assigned subgroup into a plurality of subsets includes determining a last entry included in the checkpoint file associated with the current backup.

12. The method of claim 11, wherein subdividing a remaining portion of the assigned subgroup into a plurality of subsets includes determining that last entry included in the checkpoint file associated with the current backup is also included in the checkpoint file associated with the previous backup.

13. The method of claim 12, wherein subdividing a remaining portion of the assigned subgroup into a plurality of subsets further includes determining a number of entries between the last entry associated with the assigned subgroup and a last entry for the assigned subgroup in the checkpoint file associated with the previous backup.

14. The method of claim 13, wherein the remaining portion of the assigned subgroup is further subdivided based on the determined number of entries.

15. The method of claim 11, wherein subdividing a remaining portion of the assigned subgroup into a plurality of subsets includes determining that last entry included in the checkpoint file associated with the current backup is not also included in the checkpoint file associated with the previous backup.

16. The method of claim 15, wherein subdividing a remaining portion of the assigned subgroup into a plurality of subsets further includes determining an entry that precedes the last entry included in the checkpoint file associated with the current backup and a last entry for the assigned subgroup included in the checkpoint file associated with the previous backup.

17. The method of claim 16, wherein subdividing a remaining portion of the assigned subgroup into a plurality of subsets further includes determining a number of entries between the determined entry that precedes the last entry included in the checkpoint file associated with the current backup and the last entry for the assigned subgroup included in the checkpoint file associated with the previous backup.

18. The method of claim 17, wherein the remaining portion of the assigned subgroup is further subdivided based on the determined number of entries.

19. A computer program product embodied in a non-transitory computer readable medium and comprising computer instructions for:
   traversing, by a prefetcher, an assigned subgroup that includes a plurality of entries;
   determining that an expected number of entries associated with the assigned subgroup have been traversed;
   in response to determining that expected number of entries associated with the assigned subgroup have been traversed, determining that a last read entry associated with the assigned subgroup does not correspond to a last entry associated with the assigned subgroup; and
   preempting the prefetcher by stopping the prefetcher from obtaining a list of entries associated with a remaining portion of the assigned subgroup.

20. A system, comprising:
   a processor configured to:
      traverse, by a prefetcher, an assigned subgroup that includes a plurality of entries;
      determine that an expected number of entries associated with the assigned subgroup have been traversed;
      in response to determining that expected number of entries associated with the assigned subgroup have been traversed, determine that a last read entry associated with the assigned subgroup does not correspond to a last entry associated with the assigned subgroup; and
      preempt the prefetcher by stopping the prefetcher from obtaining a list of entries associated with a remaining portion of the assigned subgroup; and
   a memory coupled to the processor and configured to provide the processor with instructions.

* * * * *